United States Patent
Carroll

[19]

[11] Patent Number: 6,105,131
[45] Date of Patent: Aug. 15, 2000

[54] SECURE SERVER AND METHOD OF OPERATION FOR A DISTRIBUTED INFORMATION SYSTEM

[75] Inventor: Robert B. Carroll, Mt. Kisco, N.Y.

[73] Assignee: International Business Machines Corporation, Armonk, N.Y.

[21] Appl. No.: 08/980,022

[22] Filed: Nov. 26, 1997

Related U.S. Application Data

[60] Provisional application No. 60/049,622, Jun. 13, 1997.

[51] Int. Cl.[7] .................................................. H04N 9/00
[52] U.S. Cl. ....................... 713/155; 713/156; 713/171; 380/258; 380/281
[58] Field of Search ..................................... 380/258, 281, 380/283, 284; 713/155, 156, 161, 168, 169, 171, 201

[56] References Cited

U.S. PATENT DOCUMENTS

| | | |
|---|---|---|
| 4,771,459 | 9/1988 | Jansen . |
| 4,868,877 | 9/1989 | Fischer . |
| 4,914,176 | 4/1990 | Wang . |
| 5,005,200 | 4/1991 | Fischer . |
| 5,218,637 | 6/1993 | Angebaud et al. ....................... 380/23 |
| 5,263,165 | 11/1993 | Janis ....................................... 395/725 |
| 5,481,610 | 1/1996 | Doiron et al. . |
| 5,530,758 | 6/1996 | Marino et al. ............................ 380/49 |
| 5,629,980 | 5/1997 | Stefik et al. ............................... 380/4 |
| 5,640,501 | 6/1997 | Turpin .................................... 395/768 |
| 5,729,594 | 3/1998 | Klingman . |
| 5,742,683 | 4/1998 | Lee et al. . |
| 5,745,574 | 4/1998 | Muftic . |
| 5,790,677 | 8/1998 | Fox et al. . |
| 5,799,285 | 8/1998 | Klingman . |
| 5,850,442 | 12/1998 | Muftic . |

OTHER PUBLICATIONS

Schneier, "Applied Cryptology", pp. 47, 48, 51, 52, 115, 181, 185, 186, 1995.

*Primary Examiner*—Thomas R. Peeso
*Attorney, Agent, or Firm*—Joseph C. Redmond, Jr.; Morgan & Finnegan, LLP

[57] ABSTRACT

A secure server in a secure distributed information system isolates interaction from terminals to specific personal vaults including and to only those personal vaults, creating a "virtual logon". The secure server includes a secure connection server coupled to the system and to a vault deposit server having personal vaults in which user specific vault processes execute on dedicated encrypted data, after authentication of the user by a vault supervisor. The supervisor forwards vault process results to the user through the browser.

15 Claims, 7 Drawing Sheets

Scenario 1: Obtaining an Organization Certificate for a Vault Deposit Server Application.

FIG. 3A

Scenario 2: Obtaining an Organization Certificate for a Web Server Application.

FIG. 3B

Scenario 3: Using an Organization Certificate for a Vault Deposit Server Application.

SECURE SERVER AND METHOD OF OPERATION FOR A DISTRIBUTED INFORMATION SYSTEM

CROSS REFERENCE TO RELATED APPLICATION

This application claims the benefit of the earlier filing date of provisional application Ser. No. 60/049,622, filed Jun. 13, 1997, assigned to the same assignee as that of the present invention.

FIELD OF THE INVENTION

This invention relates to distributed information systems. More particularly, the invention relates to an enhanced secure server in a distributed information system, for example, the Internet.

BACKGROUND INFORMATION

The explosive growth of the World Wide Web ("web") significantly increased the number of organizations using the Internet for business purposes. Unfortunately with this growth, the potential for theft of data, programs, and other electronic information significantly increased. Currently, users desiring secure communication use traditional userid/password logon processes and access secure web servers over an encrypted link.

Some web browsers provide a secured link by utilizing a security protocol, such as the Secure Sockets Layer ("SSL") developed by Netscape Communication Corporation in Mountain View, Calif. With version 3 of this protocol, a user ("client") identifies itself using a form of strong authentication, for example a public key. The server processes requests for information only after successful authentication. Then the server grants access to specific resources, invokes server extensions, or invokes other applications. However, these safe guards fail to provide enough security. In particular, secure web servers generally assume that the server administrators, application developers, and computer operators can all be trusted. Additional safeguards are needed to reduce the possibility of an attack either due to fraudulent or mis-use of confidential information or by forgoing or altering a transaction.

Therefore, an improved level of security and trust is needed for organizations to take advantage of distributed information networks in conducting business electronically, particularly in processing sensitive customer information over the Internet or when processing transactions of significant financial or other fiduciary value.

SUMMARY OF THE INVENTION

An object of the invention is a system including a secure server and processes enabling operating system integration through virtual logon and user data encrypted in "personal vaults".

Another object is a system including a secure server and method of using processes owned by and dedicated to each concurrent user with user data stored in "personal vaults" managed by the server and encrypted by an encryption key.

Another object is a system including a secure server having "personal vaults" which are highly secure, network centered, processing and data storage areas accessible through a standard secure web browser.

These and other objects, features and advantages are achieved in a secure distributed information system including a secure server which includes "personal vaults" in a vault deposit server. Information stored in personal vaults is protected against disclosure by encryption; against tampering by digital signatures; and against untrusted communications with unknown parties by digital certificates. The vault deposit server ("VDS") comprises a connection secure server coupled to a vault process supervisor ("VPS"), that manages access to vault processes.

The vault process runs in the VDS on behalf of the owner of the vault where it resides. For example, a unique UNIX™[1] userid given sole access to a UNIX™ subdirectory. The subdirectory is accessible only to an owner of the vault and has access privileges. In addition, vault processing decrypts the files using the vault encryption key. A certificate, called the vault certificate, is issued to each vault owner to establish access to the secure server. Certificates are also called certified keys because they include the public key from a private key-public key pair. The vault process can be started only by the vault supervisor and only after a user presents a unique vault certificate associated with that vault. The vault process supports secure end-to-end communication; re-entrant and persistent vault programming; communication.

[1] UNIX is a registered trademark of UNIX Systems Laboratories, Inc. of Delaware.

DESCRIPTION OF THE DRAWING

The invention will be further understood from the following detailed description of a preferred embodiment taken in conjunction with the appended drawings, in which.

DESCRIPTION OF PREFERRED EMBODIMENT

Figure 1:
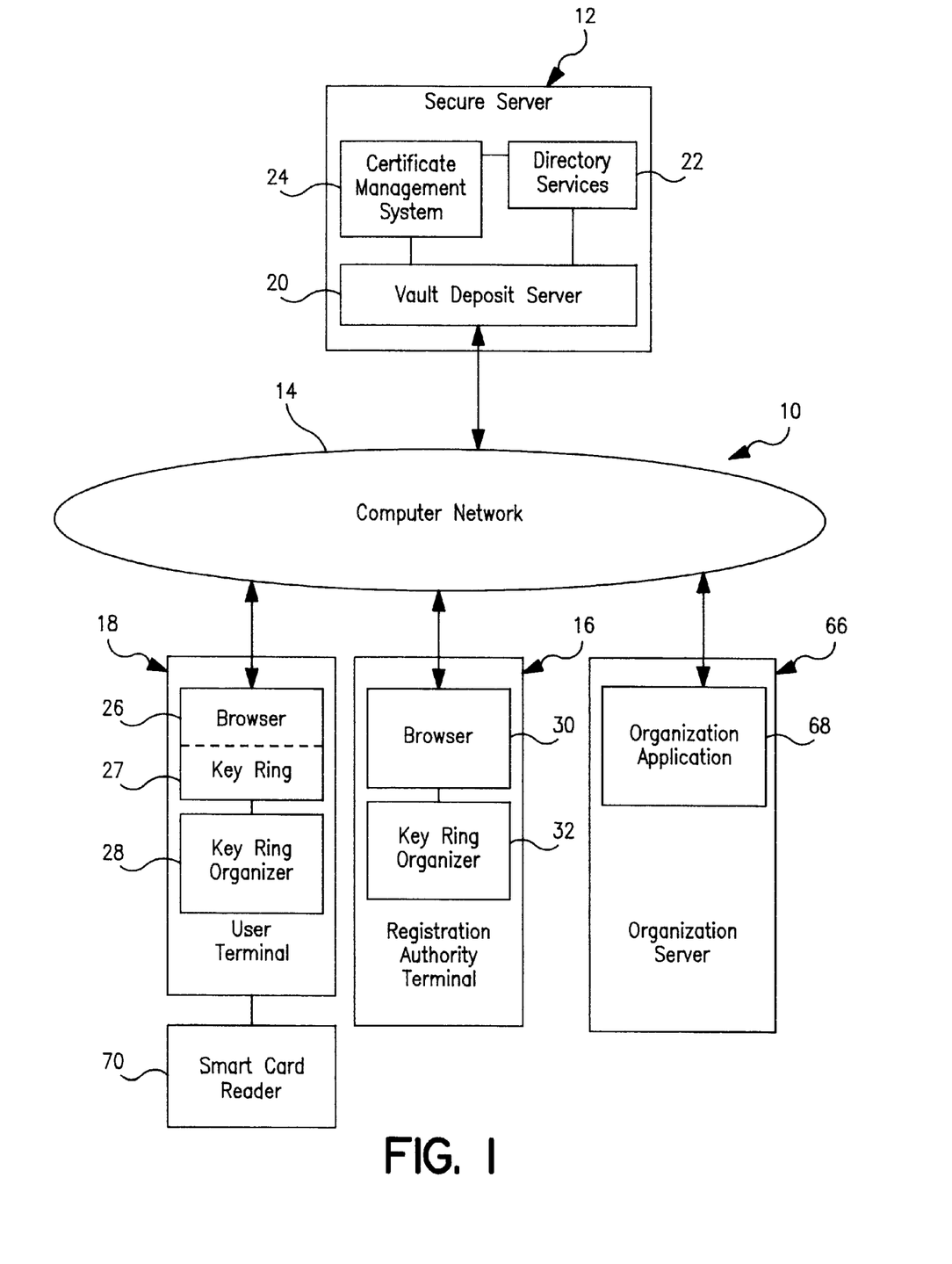
FIG. 1 is a representation of a secure distributed information system.

In FIG. 1, a secure distributed information system 10 includes a secure server 12, a user terminal 18, and a computer network 14 connecting the secure server 12 and the user terminal 18. Optionally, a registration authority terminal 16 can be connected to the computer network 14. Additionally, an organization server 66 can be connected to the secure server 12 over the computer network 14.

Figure 2:
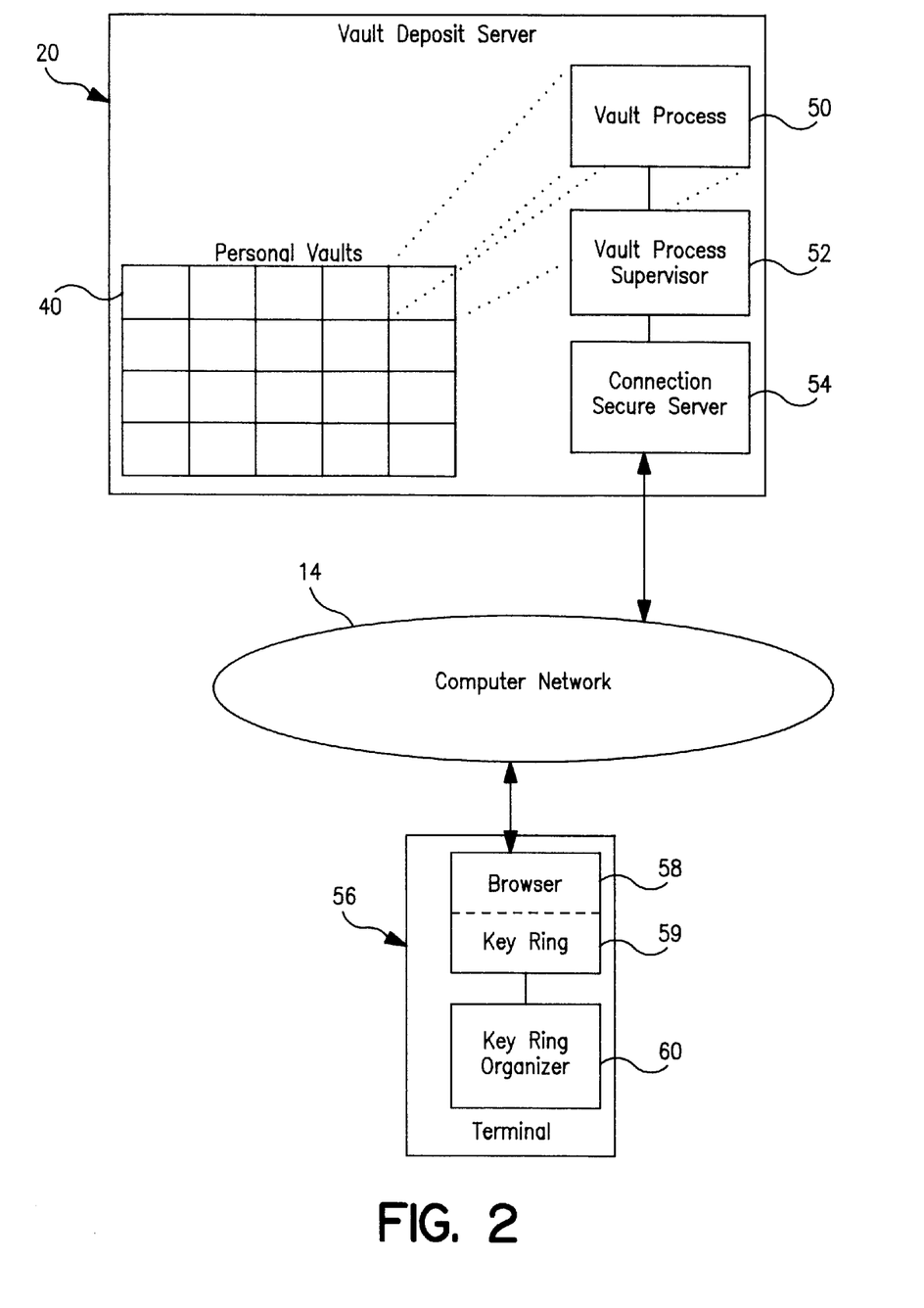
FIG. 2 is a representation of a vault deposit server functioning in the secure distributed information system of FIG. 1.

The distributed information system 10 provides end-to-end secure communication. Communication between a user terminal 18 and the secure server 12 are protected with Secure Sockets Layer ("SSL") protocol and user authentication. SSL is manufactured and sold by Netscape Communication Corporation, Mountain View, Calif. Each connection from the user terminal 18 includes a vault certificate for an appropriate personal vault 40, as shown in FIG. 2. Upon connection, a vault process supervisor 52 validates and maps the vault certificate to a personal vault using the supervisor private key, which is secured in hardware in the secure server 12.

The secure sockets layer ("SSL") protocol, developed by Netscape Communication Corporation of Mountain View Calif., provides secure communication over computer networks and supports higher level protocols including HTTP, FTP, and Telnet. SSL provides secured communication by cryptographic algorithms including "RSA Public Key Encryption" and Message Digest 5 ("MD5") from RSA Data Security Incorporated.

Returning to FIG. 1, a user terminal 18 includes an application 26, for example a browser, such as Netscape's Navigator 4.0 or Microsoft's Internet Explore 4.0 that is responsive to user input and connects to remote applications across a computer network 14. Keys used for encryption and authentication are managed by built-in key ring organizer 27 in the browser 26.

Optionally, a key ring organizer 28 can be a separate plug-in application for the browser 26. The KRO 28 can be accessed by the secure server 12 to generate, store, and select keys for use in signing information or authenticating the userid thereby enabling secure applications. Authentication includes reliably determining the identity of a network device contacting the secure application.

The KRO performs key ring processes, key catalog processes, key management processes, and smart card processes. It maintains a virtual key ring of digital keys, that is, the KRO tracks multiple private key per user. The key ring supports private keys stored on a variety of media including smart cards, PC cards, a hard-disks, or a diskettes. Each key ring is password protected with a unique password. The catalog processes maintain all keys associated with a user regardless of the physical location of the various keys. The key management processes generate and store keys. Also, it selects the appropriate key for digital signature or authentication.

The optional smart card process within the user terminal maintains keys on a "smart card" (not shown). For example, a smart card may be a credit card size device containing a CPU and memory or other device for the same purpose. Optionally, a smart card reader 70 can be attached to a user terminal 18. The smart card operates in a challenge-and-response cryptographic process. The smart card reader 70 enciphers and deciphers information using the appropriate key. A user terminal 18 that knows the key can authenticate the smart card by verifying the response to random challenges, yet the smart card never reveals the key. The smart card and a smart card reader 70 provide an additional level of protection by requiring a physical device, the smart card, to be present before interacting with the secure server 12.

The keys managed by the built-in or plug-in key ring organizer 27, 28, respectively can reside on a hard disk in the user terminal 18 or on a removable media such as a floppy disk or smart card. Hereinafter, for description purposes only, the use of the term KRO refers to either the built-in KRO 27 or the plug-in KRO 28.

User terminals 18 can be a personal computer, work station, main frame, laptop, or other network compatible devices. User terminal 18 includes a CPU, monitor, keyboard, mouse and other peripheral devices (all not shown) commonly associated with such computers.

For example, user terminals 18 include a World Wide Web browser 26 implementing the Secure Sockets Layer ("SSL") protocol and a key ring organizer ("KRO") built-in 27 or plug-in 28 application. Both the built-in and plug-in KROs allow multiple keys and certificates to reside on a single machine, each key or certificate can be used to access a different vault.

The registration authority ("RA") terminal 16 also includes a browser 30 and a key ring organizer ("KRO") 32. The RA terminal 16 communicates with the secure server 12 and the user terminal 18 over the computer network 14. The RA terminal 16 can be a personal computer, work station, main frame, laptop, or other network compatible devices. The RA terminal 18 includes the CPU, monitor, keyboard, mouse and other peripheral devices (all not shown) commonly associated with such computers.

The computer network 14 connects user terminals 18 and RA terminal 16 to the secure server 12 and third party terminals 66. The computer network 14 can include a variety of networks especially the Internet.

The secure server 12 includes a vault deposit server ("VDSI") 20 connected to a certification management system ("CMS") 24 and optionally a directory services 22. The secure server 12 can be a single physical machine or multiple machines linked together. An implementation of the secure server 12 is the IBM World Registrations service described in a publication "IBM World Registry General Information Guide", published by IBM Corp., dated Jun. 4, 1997.

The vault deposit server ("VDS") 20 securely links remote terminals to vaults 40 (FIG. 2) contained in the vault deposit server 20.

The certification management system ("CMS") 24 publishes and manages certificates, such as X.509v3 certificates. Certificate management includes issuing new certificates, suspending certificates after a predefined event occurs, resuming certificates, and renewing certificates. Publishing of certificates includes publishing certificates, the associated Certificate Revocation Lists ("CRLs"), and policy information. The policy information is provided by a directory services 22, such as X.500. An example of CMS 24 is IBM's Registry 1.0, described in a publication "IBM registration System Overview and Installation Guide for AIX 4.1", published by IBM, pages 5–7, dated January 1997.

For each certification management system ("CMS") 24 there may be a validator vault to process registration requests. A validator vault is a specific type of personal vault 40 (FIG. 2) that resides in the VDS 20. Uncertified users automatically access a validator vault to begin the registration process.

A certification vault for each CMS 24 is used to process requests from a Registration Authority including vault creation requests and certification requests.

A certificate (also called digital certificate) is an electronic credential issued by a trusted third party. Each certificate is signed with the private key of the certificate management system. The certificate vouches for the identity of an individual, business, or organization. The four types of certificates described herein are vault, organization, signing, and encryption. The certificate contains information about the individual it certifies and includes as part of this information the certified public key of that individual.

Vault certificates provide access to vault processes 50. Vault certificates are stored in a browser 26, 30 or 68 or a separate KRO 28 or 32 in a terminal 18, 16 or 66. Vault certificates are used to authenticate the user before establishing a secure link: between a terminal 18, 16, or 66 and a secure server 12.

Organization certificates provide secure access to an organization's applications. Organization certificates are created by an organization's CMS and approved by an organization's RA. Encryption certificates provide certification of encryption keys used in personal vaults. Signature certificates provide certification for signature keys in personal vaults.

Organization processes allow the user terminal 18 to communicate with an organization's server directly over the computer network 14. Organization servers includes for example, bank server 66.

Alternatively, after receiving an organization certificate, the user terminal 18 can execute an application in the personal vault in the vault deposit server 20 associated with the user at the user terminal 18. The application then connects with the organization server.

The directory services 22, for example X.500 directory services, includes a searchable database containing certificates, such as X.509 certificates, certificate revocation list ("CRL"), CMS policies, and other information relating to registered users, terminals and servers including unique distinguished name ("DN"). The International Organization for Standardization ("ISO") maintains the X.500 standard which is an Open System Interconnection ("OSI") standard. The X.500 standard provides scaleability, access via Lightweight Directory Access Protocol ("LDAP") standard protocol, flexible hierarchical certificate management and site access, and access control procedures. The directory services 22 operates in conjunction with Certificate Revocation List ("CRL") for each certificate authority, stores X.509 certificates using extended certificate data structures, and handles multiple certificate authorities implementing unique registration policies. An example of the directory services implemented with AIX™[2] operating system is Telstra's LDAP/X.500 described in publication "Telstra LDAP/X.500 Directory for AIX Version 4.1 PRPQ 5799-FZA."

[2] AIX is a registered trademark of International Business Machines Corporation of Armonk, N.Y.

Users having access to a vault can transmit encrypted inter-vault communications to users of other vaults. The communication is encrypted with the public key of the recipient's vault and signed with the private signature key of the sending vault. The destination address and public key needed for communication are determined using entries in the directory services 22.

Turning to FIG. 2, the vault deposit server ("VDS") 20 includes personal vaults 40 and processes including a connection secure server 54 (a world wide web server that supports connections via SSL Ver. 3), a vault process supervisor ("VPS") 52, and vault processes 50. Personal vaults 40 assigned to users include logical collections of user data and user applications (vault processes) accessible only to authenticated users.

Vault deposit server ("VDS") 20 requests digital keys from the KRO 60 in the terminal 56 attempting to access the vault 40. The KRO 60 automatically verifies the appropriate key and transmits the key to the VDS 20 without user interaction.

Personal vaults 40 in a vault deposit server 20 includes vault processes, disk space, encryption and signature keys and certificates, and directory services entry.

Vault processes 50, execute in personal vaults 40, and are managed by the vault process supervisor 52. To execute a vault process 50 the vault process supervisor 52 must receive the vault certificate associated with the personal vault 40 from a KRO 59 or 60.

Disk space in a personal vault 40 is protected from applications executing in other vaults by file system permission at the operating system level. Only the vault owner (e.g. user, RA, etc.) and the system administrator can access the disk space. Since information in the vault is encrypted, the files are unintelligible to the system administrators. An example of an operating system with such file system permissions is UNIX™, and more specifically IBM's AIX™ operating system. For example, AIX™ provides permissions for each subdirectory, which can limit access including read permission, write permission, directory permission, and permission to change others' permissions.

Protection of data stored in a personal vault 40 includes encryption, digital signatures, and digital certificates. Each personal vault 40 uses a pair of keys (a private key and a public key) for encryption and decryption and a different pair of keys for digital signatures. Trusted communication is achieved in part by digital certificates, such as X.509v3.

Personal vaults 40 can be used for various purposes including but not limited to user vaults, validator vaults, and certificate management system vaults. User vaults are the most common type of personal vault 40. Validator vaults are used to process transmissions from uncertified users.

Vault processes 50 can be multi-threaded application, thus multiple simultaneous requests from a user are possible. A valid access to a vault process 50 that is already running on behalf of the user results in that user being connected to existing vault process 50. For example, if a user is running multiple web browsers, each web browser session accesses the same multi-threaded vault process. Each web browser session accesses it own storage area in the vault deposit server 20.

The VPS 52 manages processes executing within personal vaults 40. The VPS 52 communicates with the connection secure server 54 and starts the vault processes 50 and maintains communication between the vault processes 50 and the user's browsers 58.

The connection secure server 54 is a network based server that provides browsers secure access to information in the personal vaults 40 using secure communication, for example secure socket layer ("SSL") communication. An example of a connection secure server 54 is IBM's Internet Connection Secure Server ("ICSS"), described in a publication "ICS, ICSS Quick Beginning V4R1, GC41-5433," dated Feb. 26, 1997.

Figure 3A:
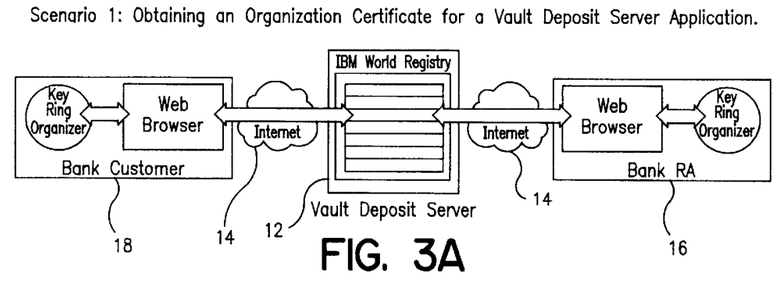
FIGS. 3A–3C are representations of scenarios using the secure server of FIGS. 1 and 2.

Turning to FIG. 3A, a user (bank customer) at a user terminal 18 requests an organization's certificate from a service provider's registration authority (bank RA) 16 using a secure server. The user transmits a registration form to the secure server 12. The request is then transmitted to the application provider's registration authority for approval. Upon approval, the secure server transmits the organization certificate to the user terminal for storage in the user's browser or key ring organizer. Once the organization certificate resides in the user terminal, the user terminal can access the organization's vaults in the secure server. This process is further illustrated in FIGS. 5 and 6.

Figure 3B:
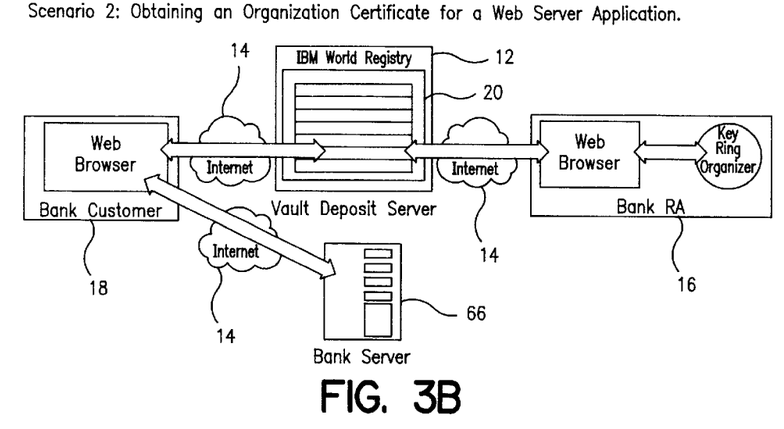

In FIG. 3B, the user obtains the organization certificate as described in FIG. 3A. With the organization certificate, the user can directly access a service provider's server (bank server) 66, independent of the secure server. This process is further illustrated in FIGS. 5 and 6.

Figure 3C:
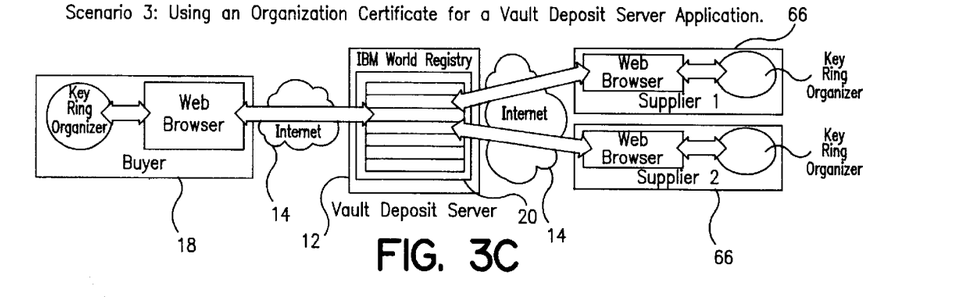

In FIG. 3C, the user obtains the organization certificate as described in FIG. 3A. With the organization certificate, the user accesses a personal vault that requires the organization certificate. The user then executes a process stored in the personal vault. The process can for example allow the user access to third party servers such as suppliers terminals 66. This process is further illustrated in FIGS. 5 and 6.

Figure 4A:
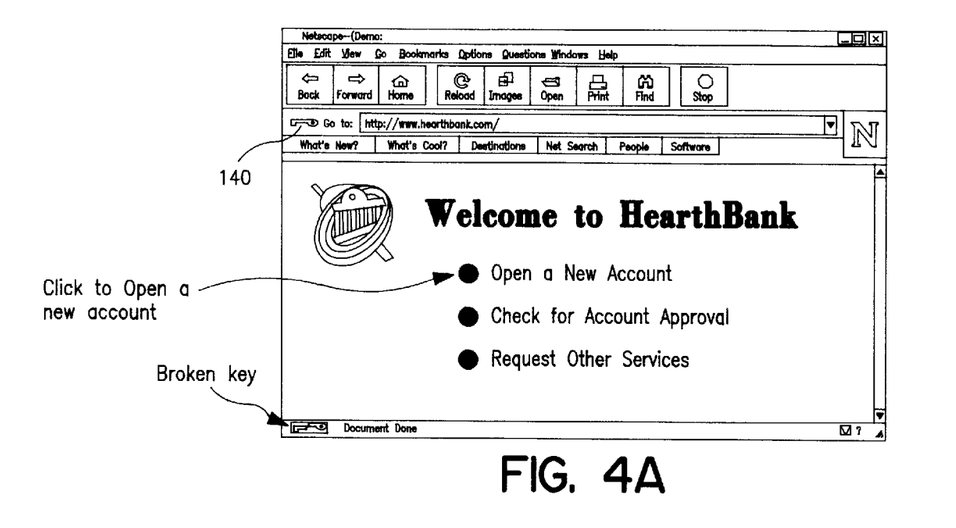
FIGS. 4A–4D are representations of electronic forms used in the business scenarios of FIGS. 5A–5C.

In FIG. 4A, a form illustrates an example of a service provider's home page that provides secure access by using a secure server 12. The home page allows uses to request new accounts, check the status of new account requests, and request other services.

Figure 4B:
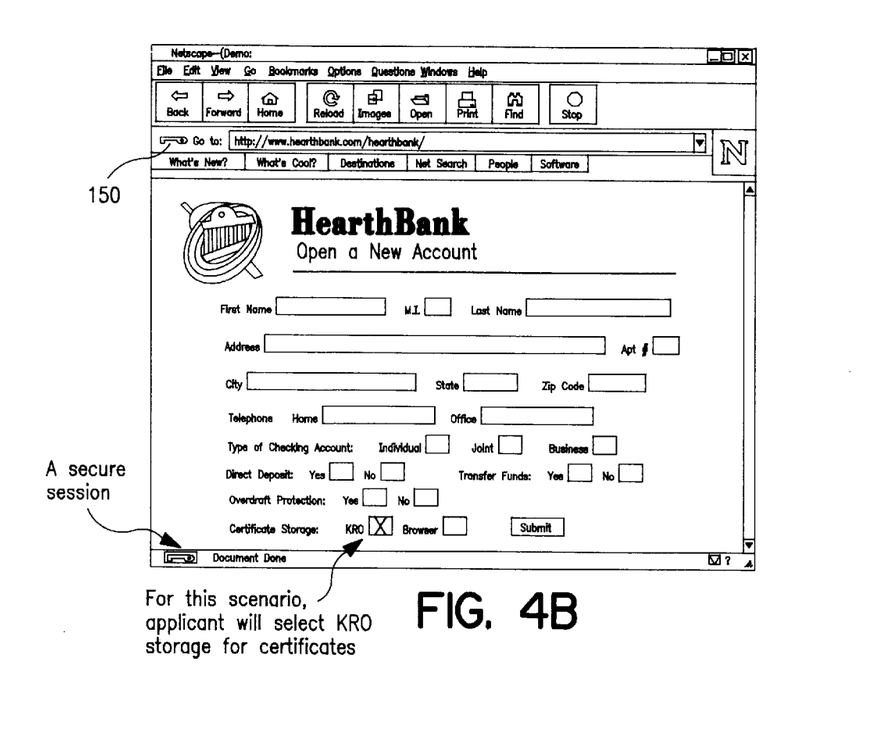

In FIG. 4B, a new account request form illustrates a set of fields. The fields may include user specific information such as name, address, and telephone number, transaction information such as account type, fund transfer, and deposit method, and terminal information such as the storage location of the certificate. The session can be secured by using SSL communication. Secure session are indicated by an unbroken arrow in the lower left hand corner of the screen.

Figure 4C:
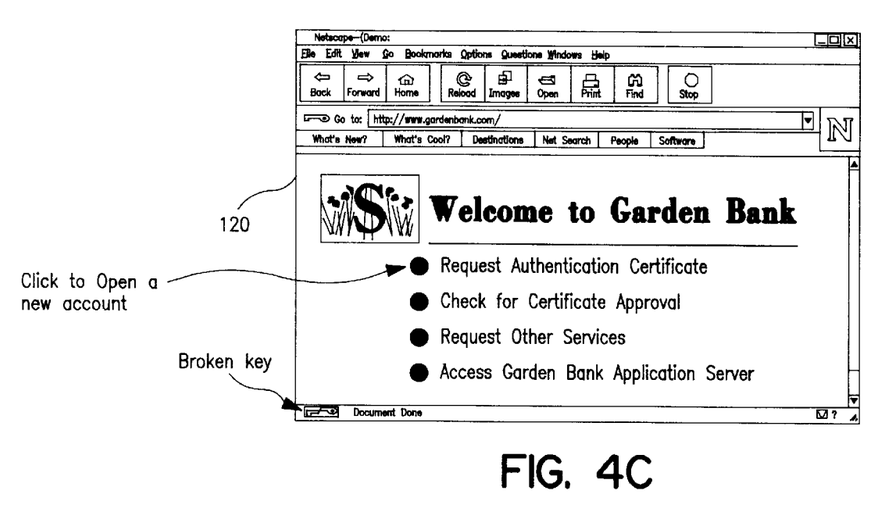

In FIG. 4C, a form illustrates a home page that allows users to request authentication certificates. The user can request a new authentication certificate, check the status of the request, request other services, or access the service provider's server using an authentication certificate.

Figure 4D:
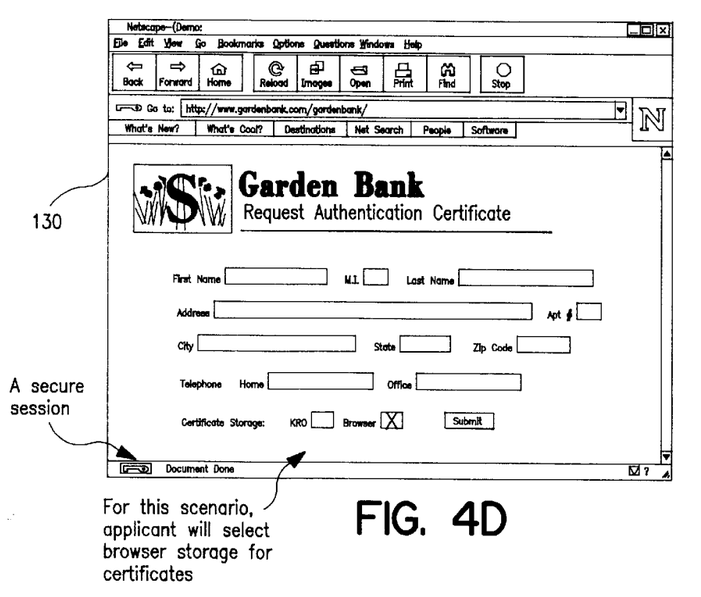

In FIG. 4D, an authentication certificates request form illustrates a set of fields. The fields may include user specific information such as name, address, and telephone number and terminal information such as the storage location of the certificate. The session can be secured by using SSL communication. Secure session are indicated by an unbroken arrow in the lower left hand corner of the screen.

Figure 5:
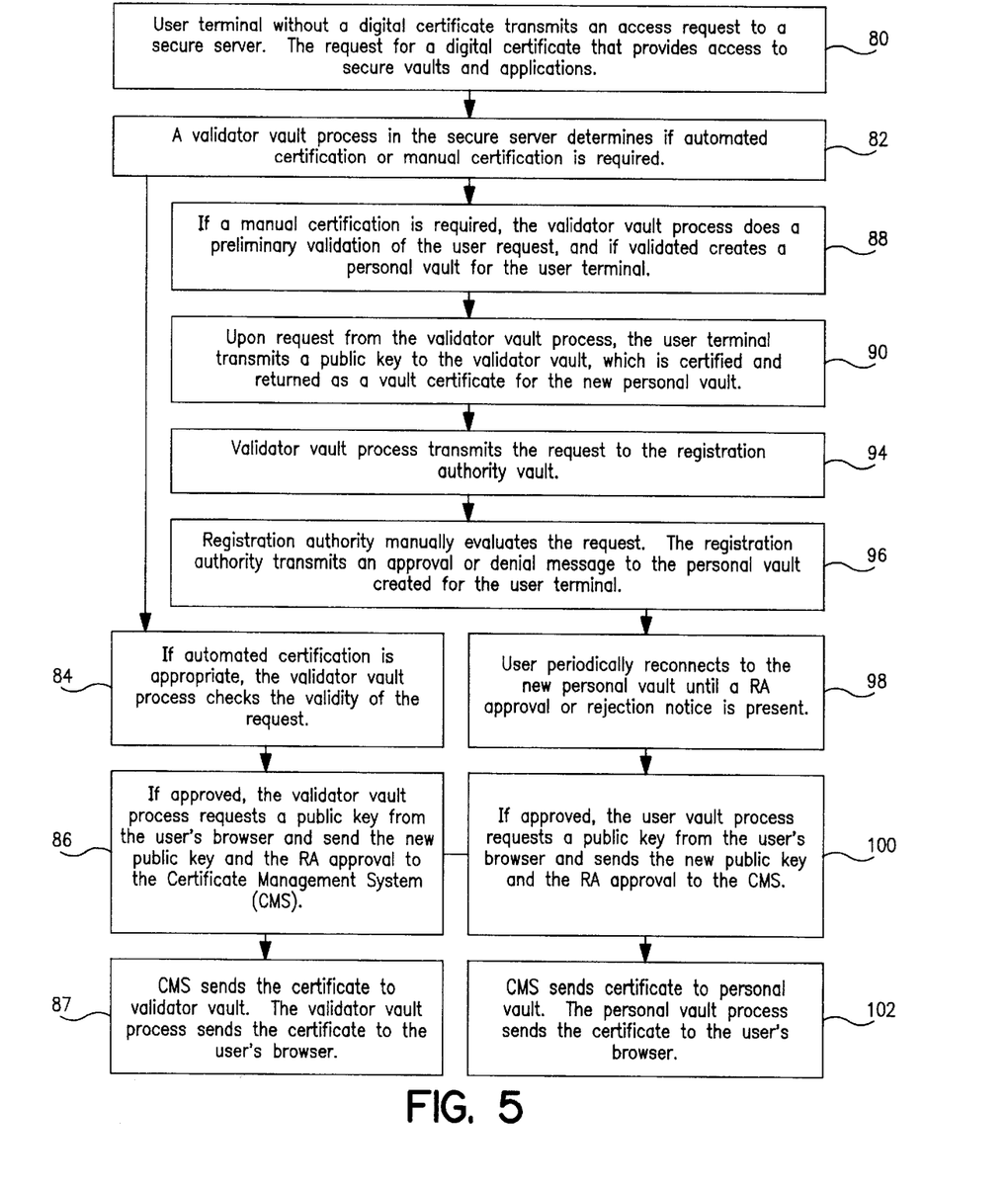
FIG. 5 is a flow diagram representing the steps to acquire a digital certificate that enable access to secure vaults and applications.

In FIG. 5, the process of acquiring a digital certificate is represented in a flow diagram. A user at a user terminal 18 (FIG. 1) desires to access a secure vault 40 (FIG. 2) or execute a secure application, for example 68 (FIG. 1). In order to gain access to the vault or application, the user terminal 18 must have a digital certificate that is approved for that application. In summary, the certification process can be automatic or manual as the secure policy of the granting entity dictates. After the user is certified, a digital certificate is transmitted to the user terminal 18 for storage. Subsequent access to the vault or application is accompanied by the digital certificate before access is granted.

In step 80, the user at a user terminal 18 transmits to a secure sever 12 (FIG. 1) a request for access to a secure vault or application. For example, in FIG. 3A a user terminal ("bank Customer") 18 transmits a request to access a vault of application in the secure server 12. For example, the request can be generated from a web browser which presents screens such as those shown in FIGS. 4A–4D.

In step 82, the request is received by a validator vault 40 (FIG. 2) assigned to the vault or application. The secure server 12 (FIG. 3A) determines that the user terminal does not have a digital certificate. The validator vault handles requests from user terminals that do not have digital certificates. The nature of the application executing in the validator vault 40 determines the appropriate certification method. The certification can be automatic or manual.

In step 84, if the request is to be automatically certified, the validator vault process verifies the completeness and accuracy of the request.

In step 86, if the request is verified, the validator vault process requests a new public key from the user's browser. Upon receipt of the new public key, the validator vault process transmits the new public key and the request to the CMS for certification.

In step 87, the CMS transmits the certified key (certificate) to the validator vault. The validator vault process transmits the certificate to the user's browser. The certificate, digital certificate, can be used to access secure vaults or processes.

In step 88, if a manual certification is required the validator vault creates a personal vault assigned to the user terminal 18 (FIG. 1) that made the certification request. Optionally, a preliminary validation of the request can be performed before the personal vault is created. The preliminary validation can include validation of completeness of the request, alpha-numeric checks, and field length checks.

In step 90, the validator vault process requests the user terminal automatically generate and transmit a public key to the validator vault for subsequent use in creating a digital certificate. Optionally, the validator vault process can then disconnect the user terminal sessions and automatically connect the user terminal with the new personal vault. The validator vault transmits the new public key to the CMS to be certified. The certificate (certified key) is transmitted to the validator vault, which in turn transmits it to the user's browser. Entrance to the new personal vault is granted only after confirmation that the user's browser contains the certified key.

In step 94, the validator vault process transmits the user's request for access to a registration authority's vault. The registration authority can be physically remote from the validator vault and connected by a computer network such as the Internet.

In step 96, the request is received at the registration authority terminal and is manually evaluated. If the request is manually evaluated, a registration authority at the registration authority terminal 16 periodically checks for new requests. The registration authority then evaluates the request to check for compliance with the RA policy. The evaluation can include off-line activities such as verifying by phone the accuracy of information. The registration authority then approves or rejects the request. An approval or rejection notice is sent to the personal vault created for the user terminal.

In step 98, the user periodically reconnects with the newly created personal vault to check for an approval notice from the RA.

In step 100, if an approval notice exists in the personal vault when the user reconnects, the user vault process requests a new public key from the user's browser and sends the new public key and the RA's approval to the CMS for certification.

In step 102, the CMS then verifies the RA's approval notice and the public key. The CMS transmits a new digital certificate to the user's personal vault. The vault process in the personal vault then transmits the new digital certificate to the user's browser. The digital certificate includes identification of the source CMS and an expiration indicator. The expiration indicator disables the certificate in the user terminal at the indicated time.

Figure 6:
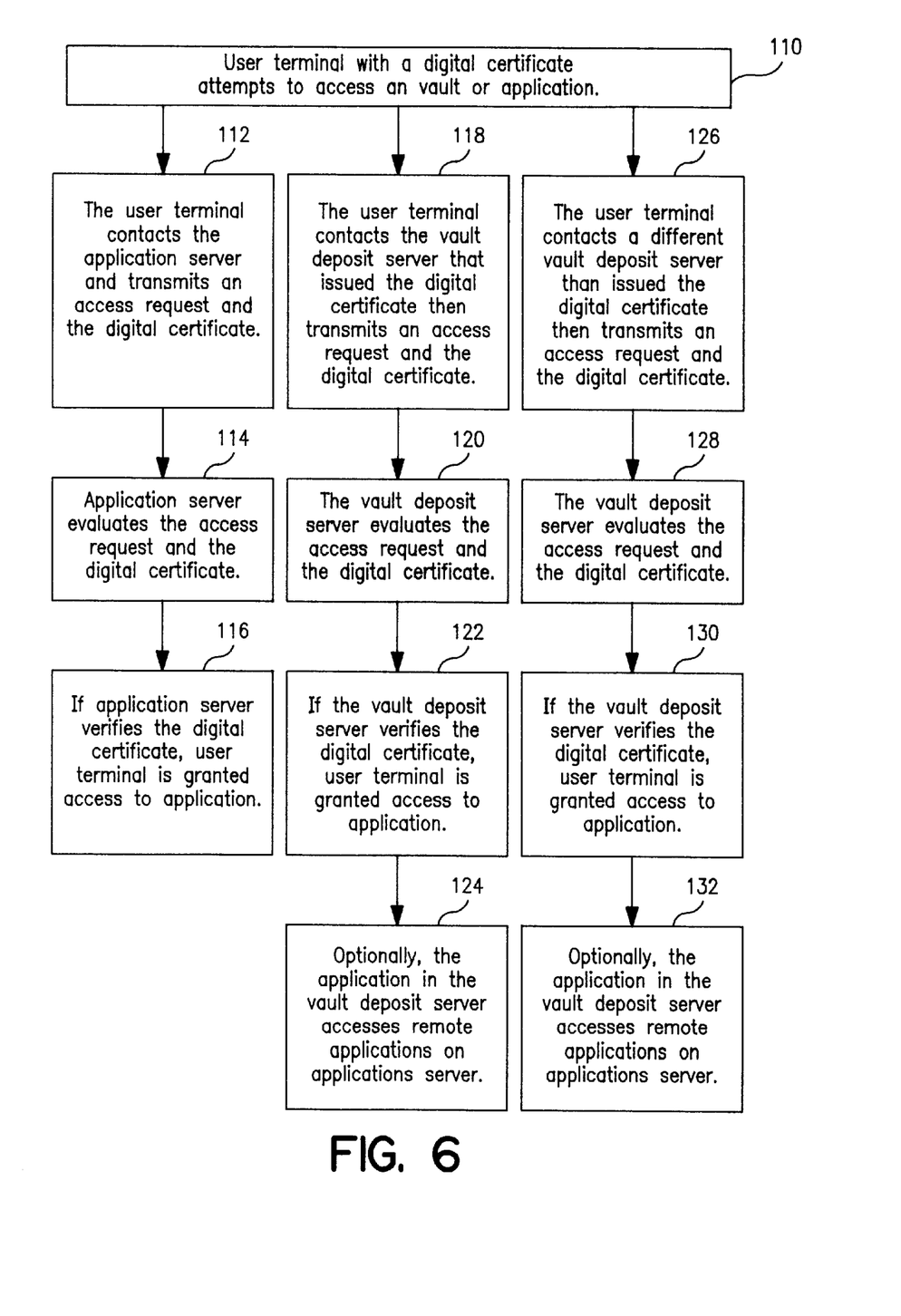
FIG. 6 is a flow diagram representing the steps to access a secure vault or application using a digital certificate.

FIG. 6 illustrates three possible uses of a digital certificate to access vaults or applications. Since each digital certificate authorizes access to a specific vault or process, the location of that vault or application dictates which of the three uses of the digital certificate is needed.

In step 110, a user at a user terminal attempts to access a secure vault or application using a digital certificate acquired in FIG. 5.

In step 112, if the application is on a remote application server such as an organization server 66 (FIG. 1). The user terminal 18 (FIG. 1) contacts the organization server 66 over the computer network 14 (FIG. 1) and transmits access request and the digital certificate. FIG. 3B represents a user at a user terminal ("bank customer") accessing an application server ("bank server") directly. The user terminal received the digital certificate from a vault deposit server 20 within a secure serve 12 that required a registration authority ("bank RA") to verify the request.

In step 114, the application server evaluates the request and digital certificate. The evaluation is an automated process the determines if the certificate is valid for the desired process and that the user is the owner of the digital certificate.

In step 116, If the application server verifies the digital certificate, the user terminal is granted access to the application.

In step 118, if the user requests access to a secure vault or process that resides on the secure server that issued the digital certificate, the user contacts the secure server and transmits the digital certificate to the secure server. For example, in FIG. 3C if the vault deposit server 20, the user terminal ("buyer") uses to access a remote application on an application server ("supplier 1"), is the same vault deposit server that issued the digital certificate.

In step 120, the vault deposit server 20 (FIG. 1) within the secure server 12 (FIG. 1) evaluates the access request and digital certificate.

In step 122, if the vault deposit server verifies the digital certificate, the user terminal is granted access to the secure vault containing the secure data or secure application.

In step 124, the user can execute the secure application within the vault. The secure application can contact a remote application on an application server. Thus, the secure application acts a gatekeeper to applications on the application server.

In step 126, a user at a user terminal attempts to contact secure sever other than the secure sever that issued the digital certificate. Each secure server can optionally have a list of certification authorities that it trusts. That is, the secure server allows access to users with digital certificates that were created by a certification management system known and trusted by the secure server. For example, all certification authorities owned by a company could trust each other. Thus, a user terminal that received a digital certificate from any one of the certification authorities could access secure vaults and applications with the digital certificate. For example, in FIG. 3C if the vault deposit server 20, the user terminal ("buyer") uses to access a remote application on an application server ("supplier 1"), is a different vault deposit server that issued the digital certificate. The vault deposit server that issued the digital certificate must be known and trusted to the vault deposit server used to access the application.

In step 128, the vault deposit server in the secure server evaluates the access request and the digital certificate to determine if access with be granted to the user terminal.

In step 130, if the vault deposit server verifies the digital certificate, the user terminal is granted access to the secure vault of application.

In step 132, the user can execute the secure application within the vault. The secure application can contact a remote application on an application server. Thus, the secure application acts a gatekeeper to applications on the application server.

While the invention has been disclosed in a preferred embodiment, various modifications may be made therein by those skilled in the art without departing from the spirit and scope of the invention, as defined in the appended claims.

What is claimed is:

1. A secure distributed information system linking together at least one user terminal and at least one secure server comprising:
   a. a network browser responsive to user input in each user terminal;
   b. a connection secure server in the secure server responsive to the browser;
   c. a storage device in the secure server for securely storing user data and processes in vaults accessible only by an authenticated user, the storage device being coupled to the connection secure server; and program instructions stored in the storage device for managing processes in vaults.

2. The secure distributed information system of claim 1 wherein the secure server further comprises:
   (a) a virtual logon means for isolating interaction from user terminals to specific vaults and only to those specific vaults.

3. The secure distributed information system of claim 2 wherein the secure server further comprises:
   a. virtual logon means for providing virtual log-on using public-key based authentication.

4. The secure distributed information system of claim 3 further comprising:
   (a) means for storing key encrypted data and processes in vaults which are accessible only after virtual logon of the user.

5. The secure distributed information system of claim 1 further comprising:
   a. a registration authority terminal connected to the secure server, wherein the registration authority terminal processes certification requests from the user terminal and returns an approval or rejection to another vault in the vault deposit server by an authenticated user.

6. The secure distributed information system of claim 1 further comprising:
   (a) a service provider server connected to the secure server, wherein the secure server authenticates user terminal access to the service provider server.

7. The secure distributed information system of claim 6 further comprising:
   (a) a registration authority terminal connected to the secure server, wherein the registration authority terminal processes certification requests from the user terminal and returns an approval, that enables issuance of a certificate for the purpose of accessing the vaults.

8. The secure distributed information system of claim 1 further comprising:
   a. a certificate management connected to the secure server, wherein the certificate management system processes certification requests and certifies user public keys to access secure vaults and applications.

9. The secure distributed information system of claim 1, wherein the storage device further comprises:
   a. a vault process that manages the certification process including receiving registration authority approval notices when appropriate and requesting certification of user public key.

10. A secure distribute information system comprising:
    (a) a user access means for transmitting and receiving user data, access keys and certificates;
    (b) a storage means for storing data and processes, wherein the storage means is partitioned and access to a partition is granted only after partition specific authentication;
    (c) a interconnection means for linking the user access means and the storage means; and
    (d) a virtual logon means for isolating interaction from user access means to specific storage means and only to those specific storage means, the virtual logon means including automatic key and certificate authentication.

11. A method of providing access to information in a secure distributed information system comprising: (a) establishing personal vaults in a secure server, the personal vaults storing user data and processes accessible only by authenticated users;
    (b) searching the secure server for the desired data or processes using a browser responsive to user input at a user terminal;

(c) requesting the browser provide access keys or certification associated with the personal vault that contains the desired data or process;

(d) providing the access keys or certification resident in the user terminal associated with the personal vault;

(e) authenticating the access keys or certification; and (f) providing access to the secure data or executing the secure process stored in the storage device.

12. The method of providing secure access to information of claim 11 wherein the step of providing access keys or certification further comprises:

(a) transmitting user specific information to the secure server;

(b) evaluating the user information in the secure server for compliance with expected format;

(c) transmitting the user information to a registration authority terminal;

(d) evaluating the user information in the registration authority terminal for compliance with predefined criteria;

(e) transmitting the certificate to the user terminal if the user information complies with the predefined criteria; and (f) storing the certificate in the user terminal for subsequent access to a personal vault protected by that certificate.

13. A secure distributed information system comprising:

a. a secure server including a vault deposit server, a certificate management system and directory services;

b. a computer network coupling the secure server to at least one user terminal and a registration authority terminal;

c. means for storing user data and processes in a personal storage vault within the vault deposit server for access only to the user after authentication; and d. a vault process supervisor in the vault deposit server for managing user access to their personal storage vault; and the processes within the user personal storage vault.

14. The secure distributed information system of claim 13 further comprising:

e. means for obtaining a digital certificate for a user from the certificate management system as authentication for user access to the personal storage vault.

15. The secure distributed information system of claim 13 further comprising:

means for encrypting/decrypting data and processes within the user personal vault using public key infrastructure.

\* \* \* \* \*